Patented Oct. 31, 1950

2,528,471

UNITED STATES PATENT OFFICE 2,528,471

REFRACTORY AND PROCESS OF MAKING THE SAME

Henry G. Fisk, Laramie, Wyo., assignor to The University of Wyoming, Laramie, Wyo., a corporation of Wyoming No Drawing. Application December 23, 1946,
Serial No. 718,121

10 Claims. (Cl. 106—63)

This invention relates to a refractory and to a process of making the same. More particularly, the invention relates to a refractory composition prepared by calcining a mixture of high calcium limestone, or other source of calcium oxide, and titanium oxide, or a mineral of high titanium dioxide content. The invention also contemplates molded articles, such as crucibles, and the like, formed by compacting and firing such a refractory composition, as well as a granular refractory suitable for ramming or tamping into place as a monolithic lining, or furnace hearth facing.

It has heretofore been proposed to use calcium oxide for refractory purposes, but in many cases the instability of calcined calcium oxide by itself makes such use impractical. It has also been proposed to make a refractory composition by mixing together calcium oxide and chromium oxide and pressing and firing the mixture. A refractory so produced has many advantages over straight calcium oxide itself, but is not so highly refractory nor so resistant to slagging as is the refractory composition of my present invention. Furthermore, such refractory is essentially a chromium oxide-calcium oxide composition with upwards of 60 percent chromium oxide, which makes such refractory so costly that wide application thereof is precluded for economic reasons.

In accordance with my present process, either a high calcium limestone, or calcium oxide or hydrated lime is mixed with a titanium dioxide-containing mineral such as rutile, or with titanium dioxide, itself, and the mixture heated to a temperature in excess of 2700° F. The proportions of ingredients of the mixture are such as to provide an ultimate composition containing between 97.5 and 85% of calcium oxide (CaO) and between 2.5 and 15% of titanium dioxide ($TiO_2$). With the lime in excess, the calcium oxide and titanium dioxide react to produce a compound having probably the formula, $3CaO.2TiO_2$. This compound forms at a lower temperature than the melting temperature of either calcium oxide or titanium oxide. As heating progresses it reacts with CaO to form a liquid phase during the firing step, thereby increasing the density of the final composition and also serving to coat the calcium oxide particles and thereby protect such particles against hydration.

The resulting product consists then of crystalline calcium oxide bonded with $3CaO.2TiO_2$ which is the compound of calcium oxide and titanium dioxide which I have found to co-exist with calcium oxide at high temperatures.

Evidence for the existence of this compound is based on chemical analysis of the compound extracted from fired compositions of calcium oxide and titanium oxide after removal of free lime with alcoholic glycerine solutions. Two analyses of the extracted crystalline phase gave the following results as compared with the theoretical composition of $3CaO.2TiO_2$:

| Preparation | Per Cent CaO | Per Cent $TiO_2$ | Total |
|---|---|---|---|
| No. 1 | 49.59 | 50.32 | 99.91 |
| No. 2 | 48.80 | 49.80 | 98.60 |
| Theoretical | 51.29 | 48.71 | 100.00 |

This compound $3CaO.2TiO_2$ has distinctive optical properties forming doubly refracting crystals of high birefringence which have parallel extinction and are uniaxial, or of small optic angle and negative sign with refractive indices $e=2.16$ and $w=2.19$. The density of this compound when determined by the pycnometer is 3.55. Although the X-ray pattern of this compound is very similar to that of perovskite ($CaO.TiO_2$) there are small but significant differences apparent.

It is quite possible to mold the desired fired shape or crucible from the initial starting materials i. e., calcium oxide, carbonate or hydrate and titanium oxide or a titanium oxide mineral. I prefer, however, to grind or pulverize and reshape the first fired mass and to subject the product to a second firing when crucibles or fired shapes are desired. Such procedure has the advantage of decreasing shrinkage in the final article and of enhancing interaction between the constituent particles. When, on the other hand, a grain refractory useful in monolithic furnace construction, or for ramming and tamping purposes is wanted, little is gained by finely grinding and refiring the refractory.

The resulting composition produced by firing a mixture of calcium oxide, or calcium carbonate, and titanium dioxide, or a mineral having a high titanium dioxide content, can be made into a molded refractory article by first pulverizing the mixture, then mixing the pulverized mixture with a bonding agent, such as a liquid hydrocarbon, and finally compressing and firing the compact so produced. Pressures of 10,000 pounds p. s. i. and over and temperatures of 3000° F. and over can be used satisfactorily in making the molded article, which may be a crucible, brick, special shape, or other refractory material.

The advantages of my refractory are its cheapness, its high refractory qualities, its stability in contact with phosphatic melts, and its stability toward slaking. Crucibles made from compositions of my refractory containing preferably between 5 and 10% of $TiO_2$, when used for the melting of phosphate rock, stand up much better than crucibles heretofore used for that purpose, It is therefore an important object of this invention to provide a refractory composition, and molded articles made therefrom, which have the advantages of relative cheapness, high refractory qualities, high stability in contact with phosphatic melts and high stability toward slaking, and comprising a calcined mixture of calcium oxide and titanium dioxide in such proportions as to produce a compound having the formula of $3CaO.2TiO_2$.

It is a further important object of this invention to provide a process of making a refractory composition and molded articles made therefrom, in accordance with which calcium oxide and titanium dioxide are mixed in such proportions and heated at such temperatures as to produce a relatively cheap refractory composition having high refractory qualities and good stability toward slaking.

It is a still further important object of this invention to provide a method of preparing a refractory composition by calcining calcium oxide and titanium dioxide in admixture and with the calcium oxide present in excess, employing temperatures in excess of 2700° F., whereby the calcium oxide and titanium dioxide react to form a compound having the formula, $3CaO.2TiO_2$, which serves to stabilize the excess of calcium oxide and to coat and bind the particles of calcium oxide.

Other and further important objects of this invention will be apparent from the following description and appended claims.

In carrying out the process of my invention, I may start with a high calcium limestone, preferably one capable of yielding 50% or over of CaO and containing not more than 5% of magnesium carbonate, or I may start with calcined limestone, or quick-lime (CaO), or hydrated lime. Since iron is an undesirable impurity in the final composition, the starting material should be as free of iron impurities as possible. The source of titanium dioxide may be any of the various titanium dioxide bearing minerals, such as rutile, which usually runs around 96% $TiO_2$, brookite, anatase or octahedrite, or perovskite ($CaO.TiO_2$), or titanium dioxide in its commercially available form.

When starting with any of these sources of CaO and $TiO_2$, their contents or yields of CaO and $TiO_2$ are first calculated and the materials are then mixed in such proportions as to give a percentage of CaO between 97.5 and 85%, and a percentage of $TiO_2$ between 2.5 and 15%. Preferably, the proportions are from 95 to 90% of CaO and from 5 to 10% of $TiO_2$. The mixes are made up with the available CaO and $TiO_2$ content taken into consideration. For example, if a mixture of $CaCO_3$ and $TiO_2$ is employed, the ingredients are mixed in the stoichiometric proportions of from 98.6 to 91% by weight $CaCO_3$ and 1.4 to 9% $TiO_2$ to yield a product containing from 85 to 97.5% CaO and from 15 to 2.5% $TiO_2$. The same product may be obtained by mixing from 98.1% to 88.6% $Ca(OH)_2$ and from 1.9 to 11.4% $TiO_2$. Other $TiO_2$- and CaO- furnishing materials may be employed in stoichiometric amounts equivalent to from 85 to 87.5% CaO and 15 to 2.5% $TiO_2$.

In the case of raw limestone and rutile, when used as starting materials, the proper proportions of the two substances are mixed together, as by grinding, and a suitable bonding agent, such as a heavy lubricating oil, is incorporated into the mixture to aid in the subsequent compacting step. Other bonding agents that can be largely driven off by volatilization or decomposition in the subsequent firing step, such as starch, dextrin, glue and lignin compounds, may be used in place of the oil. Where, however, free calcium oxide (CaO) is one of the starting materials, a binder that does not cause slaking of the CaO should be employed, such as a hydrocarbon oil, cellulosic esters and ethers and other organic substances. After being thoroughly ground together, the mixture is pressed into pellets at pressures of 2000 pounds p. s. i. or higher. The degree of pressure is not critical, since it can be carried up to as high as 10,000 pounds p. s. i., or even higher. The pellets so produced are then calcined, as by firing in a surface combustion furnace, or rotary kiln, at temperatures in excess of 2700° F., and preferably at a temperature of around 3200° F. The preferred fuel in a surface combustion furnace is a mixture of gas and air.

After calcining for a sufficient period of time, in the neighborhood of one half to one hour, to convert substantially all of the calcium carbonate into CaO, and to allow interaction of the CaO with $TiO_2$ the pellets are allowed to pass from the rotary kiln or to cool in the furnace and then removed and ground. The calcined material is preferably ground until it will pass a 200 mesh screen. After screening, the calcined material may be brought into the field of a powerful magnet to remove any magnetic iron that may have been picked up during the grinding.

The resulting composition has highly refractory properties and before grinding is relatively stable toward slaking. As a result of the calcining step, a compound of the formula $3CaO.2TiO_2$ is formed. This compound forms at a lower temperature than the melting point of either CaO or $TiO_2$ and through reaction with CaO present produces a liquid phase during the calcining step. As a result, the unreacted particles of CaO, which is present in large excess, are coated with the compound while in liquid phase, and, since the compound is completely stable toward slaking, such coating protects the CaO particles.

If it is desired to form molded articles from the refractory composition prepared as above described, the pulverized, calcined material is intimately mixed with a very small amount of a bonding agent, such as a light lubricating oil or other liquid hydrocarbon. The resulting mixture is then charged into a mold, such as a tapered crucible mold formed of hard steel and provided with a core coated with beeswax or other organic waxy material. This coating seems to help in the prevention of laminations in the bottom of the crucible. The mold is then subjected to pressures of 10,000 pounds p. s. i., or over. After the molded article has been extracted from the mold, it is fired at temperatures in excess of 3000° F. and preferably at temperatures of around 3400° F., or even higher.

Crucibles made by the molding operation just described may suitably be used in the melting of phosphatic rock. From tests made with crucibles of different proportions of CaO and $TiO_2$, it would appear that a crucible composition of between 95 and 90% of CaO, and between 5 and 10% of $TiO_2$ stands up best when used for melting phosphatic rock.

The effect of different compositions of the refractory material upon density and absorption of the calcium oxide-titanium dioxide pellets pressed at around 7200 pounds p. s. i. and fired at about 3200° F. is given in the following table:

|  | 0.0% Rutile | 2.5% Rutile | 5.0% Rutile | 7.5% Rutile | 10% Rutile | 12.5% Rutile | 15% Rutile |
|---|---|---|---|---|---|---|---|
| Apparent Density | 2.80 | 2.84 | 2.98 | 2.81 | 3.04 | 3.01 | 2.98 |
| Absorption | 5.16 | .34 | .38 | .14 | .16 | .19 | .22 |

The above table shows that compositions with from 7.5% $TiO_2$ to 12.5% $TiO_2$ give minimum absorption with maximum apparent density.

The absorption test referred to in the above table is one that is made by placing pellets of the fire material at ordinary room temperature (20° C. approx.) in kerosene for 96 hours, the increase in weight being expressed as per cent absorption. The lower the per cent absorption, the more dense and less porous are the pellets, and therefore the greater their stability against slaking and slagging.

It is not necessary to go through the pellet-forming step that has been described above. Instead, the starting materials, in the form of pulverized limestone and rutile, can be fed into a kiln in the same way as a cement raw mix is fed in the making of Portland cement clinker by either the wet or dry process. The lime (CaO) formed by calcining and the titanium dioxide present react in the kiln at the temperatures employed of 3000° C. and over to form a clinker or sinter, which upon being discharged from the kiln is crushed to form granules. The refractory granules so produced can be used directly in the construction of monolithic furnace walls or for the repair of furnace walls and floors, as by ramming and tamping methods.

With regard to crucibles made as herein described, such crucibles have been successfully used for phosphatic melts containing from 23 to 28% of $P_2O_5$ and from 45 to 52% of CaO.

It will, of course, be understood that various details of the process may be varied through a wide range without departing from the principles of this invention and it is, therefore, not the purpose to limit the patent granted hereon otherwise than necessitated by the scope of the appended claims.

I claim as my invention:

1. A refractory composition comprising a calcined mixture containing from 95 to 90% total CaO and from 5 to 10% total $TiO_2$, with substantially all of the $TiO_2$ present as $3CaO.2TiO_2$.

2. A refractory composition comprising a calcined mixture of particles of CaO coated and bonded together with a compound having the formula, $3CaO.2TiO_2$ the composition having a total CaO content of from 85 to 97.5% by weight and a total $TiO_2$ content of from 2.5 to 15% by weight.

3. A molded article having highly refractory properties, comprising between 97.5% and 85% total CaO and between 2.5% and 15% total $TiO_2$, with the $TiO_2$ present as $3CaO.2TiO_2$, the article having an apparent density between 2.8 and 3.04, and an absorption of between 0.14 and 0.38 by weight of kerosene.

4. A refractory composition in granular form comprising a calcined mixture of lime and titanium dioxide analyzing between 97.5 and 85% total CaO and between 2.5 and 15% total $TiO_2$ part of said CaO and substantially all of said $TiO_2$ being present as $3CaO.2TiO_2$, said composition being resistant to slaking.

5. A refractory composition comprising discrete particles of CaO coated and bonded together with a compound having the formula $3CaO.2TiO_2$, the composition containing from 97.5 to 85% total CaO and from 2.5 to 15% total $TiO_2$ by weight.

6. A refractory composition comprising a calcined mixture containing 97.5% to 85% total CaO and from 2.5% to 15% total $TiO_2$ by weight, with substantially all of the $TiO_2$ present as $$3CaO.2TiO_2$$

7. The process of making a refractory composition which comprises mixing from 97.5% to 85% by weight of CaO and from 2.5% to 15% by weight $TiO_2$, calcining the mixture at a temperature of about 3200° F. to obtain a calcined material consisting essentially of CaO and $TiO_2$, with substantially all of the $TiO_2$ present as $3CaO.2TiO_2$, and pulverizing the resulting calcined material.

8. The process of making a refractory composition which comprises mixing from 98.6% to 91% $CaCO_3$ and from 1.4% to 9% $TiO_2$, and calcining the mixture at a temperature of about 3200° F. to obtain a calcined mixture consisting essentially of from 97.5% to 85% by weight CaO and from 2.5% to 15% by weight of $TiO_2$ with substantially all of the $TiO_2$ present as $$3CaO.2TiO_2$$

9. The process of making a refractory composition which comprises mixing from 98.1% to 88.6% $Ca(OH)_2$ and from 1.9% to 11.4% $TiO_2$, and calcining the mixture at a temperature of about 3200° F. to obtain a calcined mixture consisting essentially of from 97.5% to 85% by weight CaO and from 2.5% to 15% by weight of $TiO_2$ with substantially all of the $TiO_2$ present as $3CaO.2TiO_2$.

10. The process of making a refractory composition which comprises mixing a compound selected from the group consisting of CaO, $Ca(OH)_2$ and $CaCO_3$ in an amount equivalent to from 97.5% to 85% CaO and a material selected from the group consisting of $TiO_2$, rutile, brookite, octahedrite and perovskite in an amount equivalent to from 2.5% to 15% $TiO_2$ and calcining the mixture at a temperature greater than 2700° F. to produce a calcined material containing from 97.5% to 85% by weight total CaO and from 2.5% to 15% by weight total $TiO_2$, with substantially all of the $TiO_2$ being present as $3CaO.2TiO_2$.

HENRY G. FISK.

REFERENCES CITED

The following references are of record in the file of this patent:

UNITED STATES PATENTS

| Number | Name | Date |
|---|---|---|
| 2,394,030 | Wainer | Feb. 5, 1946 |

OTHER REFERENCES

Chemical Abstracts, article by Parga, Pondal et. al., vol. 28 (1934), page 61.

Chemical Abstracts, article by Ershov, vol. 35 (1941), page 5273.